May 28, 1963  A. V. KLANCNIK  3,091,363
POSITIONING FIXTURES
Filed March 14, 1960  2 Sheets-Sheet 1
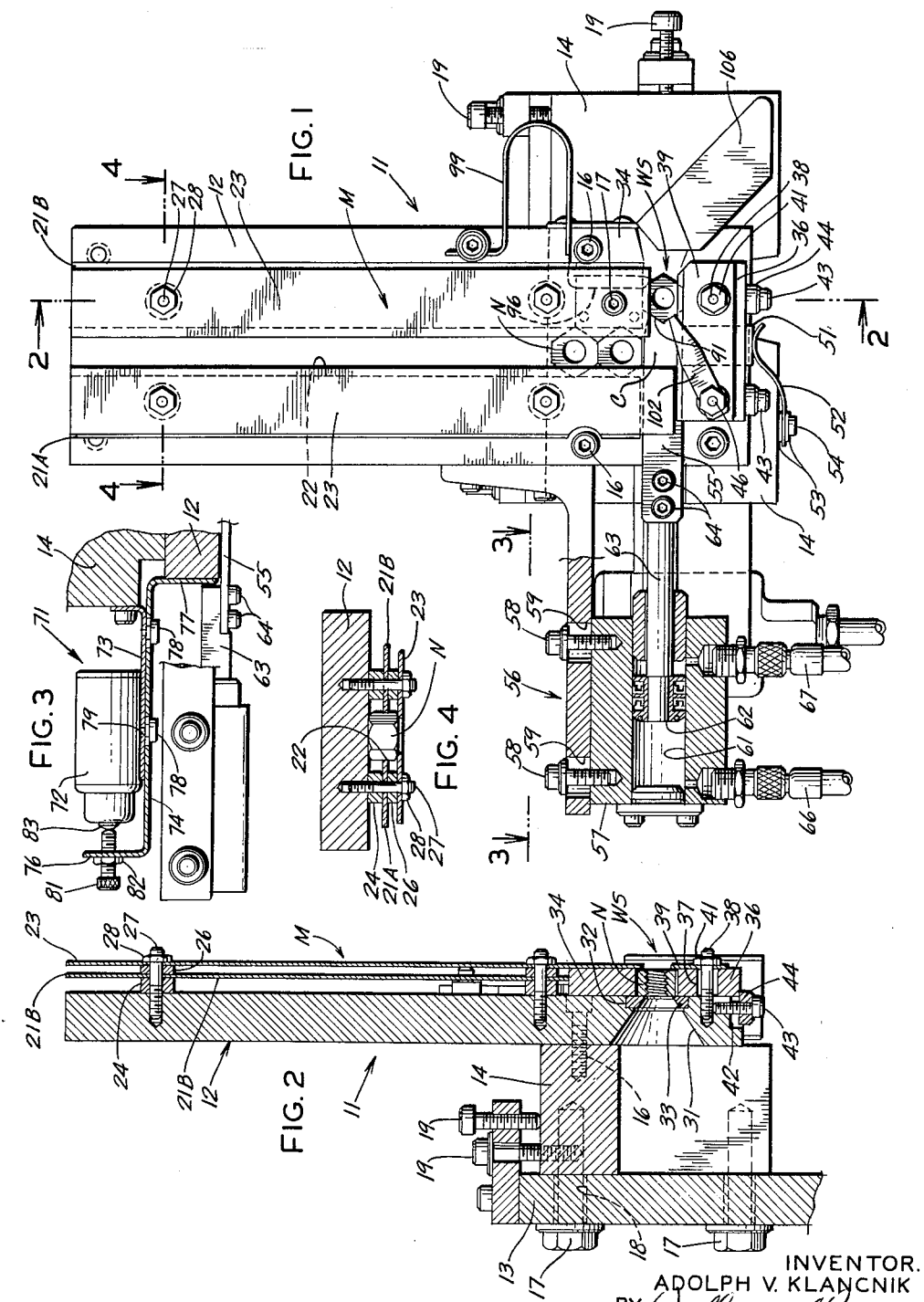
INVENTOR.
ADOLPH V. KLANCNIK
BY
ATTORNEYS May 28, 1963 A. V. KLANCNIK 3,091,363
POSITIONING FIXTURES
Filed March 14, 1960 2 Sheets-Sheet 2

INVENTOR.
ADOLPH V. KLANCNIK
BY
ATTORNEYS dunited States Patent Office 3,091,363
Patented May 28, 1963

3,091,363
POSITIONING FIXTURES
Adolph V. Klancnik, 1020 Glenview Road, Glenview, Ill.
Filed Mar. 14, 1960, Ser. No. 14,769
3 Claims. (Cl. 221—243)

This invention relates to a positioning fixture for sequentially feeding a plurality of individual workpieces such as hex nuts or the like one-by-one from a magazine to a work station wherein a machining operation is to be performed on the workpieces.

A positioning fixture constructed in accordance with this invention includes guide members which define a magazine affording a first guideway adapted to contain a supply of workpieces that are to be threaded, tapped, drilled, deburred, or have like operations performed thereon and a transfer or second guideway having the work station disposed intermediate the ends thereof and extending substantially perpendicularly from one end of the magazine. A positioning member, in the form of a plunger, is linearly reciprocable in feeding and retracting directions in the transfer guideway, and the stroke of the plunger is sufficient to transfer a workpiece from the feed-out end of the magazine to the work station on each movement of the plunger in a feeding direction.

In feeding workpieces having peripheral configurations which include projecting corners or the like, such as nuts having peripheral corners and flats, the workpieces, in passing from the magazine to the second guideway, are quite apt to become tilted at an angle such that the projecting portions thereof may hang up on or become wedged into the side walls of the second guideway, thus causing jamming of the positioning fixture, and it is an object of this invention to construct a positioning fixture which avoids such problems.

In accordance with the present invention a plunger is formed with a surface complementary to the periphery of a workpiece for maintaining the workpiece in predetermined angular orientation when engaged therewith. Also, a block member is generally axially aligned with the magazine guideway and is resiliently biased toward a position wherein the block member defines a portion of the side wall of the transfer guideway. Thus, the block member faces the feeding end of the magazine. The block member is movable laterally outwardly of the transfer channel guideway against the resilient bias in coordination with movement of the plunger in a feeding direction by impingement of a projecting portion of a workpiece thereon. Thus, the block member effectively serves as a bumper block which enables a workpiece to be rotated to said predetermined angular orientation, as determined by mating engagement of the complementary formed surfaces of the plunger and the workpiece, whenever a corner of the workpiece engages a portion of the transfer guideway opposite to the block member. As a result, problems of jamming are avoided and a high rate of feed of the workpieces can be maintained. And to incorporate the above-described structural features in a novel positioning fixture is a specific object of this invention.

It is another object of this invention to incorporate a resiliently biased escapement mechanism, including a trigger element having a surface engageable with a workpiece, at the work station to limit movement of the workpiece beyond the work station until the workpiece is displaced therefrom by a subsequent workpiece transferred to the work station by the plunger.

It is another object of this invention to include in a positioning fixture a resilient retainer member having an edge engageable with a surface of the workpiece opposed to that engaged by the escapement mechanism to prevent return of the workpiece with the plunger during retraction of the plunger from the work station.

It is another object of this invention to incorporate both the escapement mechanism and the resilient retaining member in a positioning fixture as aforesaid to insure positive positioning of the workpiece at the work station between the escapement mechanism and the retaining member.

It is yet another object of this invention to incorporate a replaceable wear bushing in a positioning fixture as aforesaid at the work station thereof in those instances in which an internal tapping operation is to be performed on the workpiece. Such a replaceable wear bushing enables a range of tap sizes to be utilized while assuring that the hole is tapped square with the face of the workpiece.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is an elevation view, partly broken away, of a positioning fixture constructed in accordance with one embodiment of the present invention;

FIG. 2 is an elevation view in section taken substantially in the direction of the arrows 2—2 in FIG. 1;

FIG. 3 is a fragmentary view taken in the direction of the arrows 3—3 in FIG. 1;

FIG. 4 is a detail view in section taken in the direction of the arrows 4—4 in FIG. 1;

FIGS. 5A and 5B are fragmentary end views of guide pieces of the fixture shown in FIG. 5.

Figure 5:
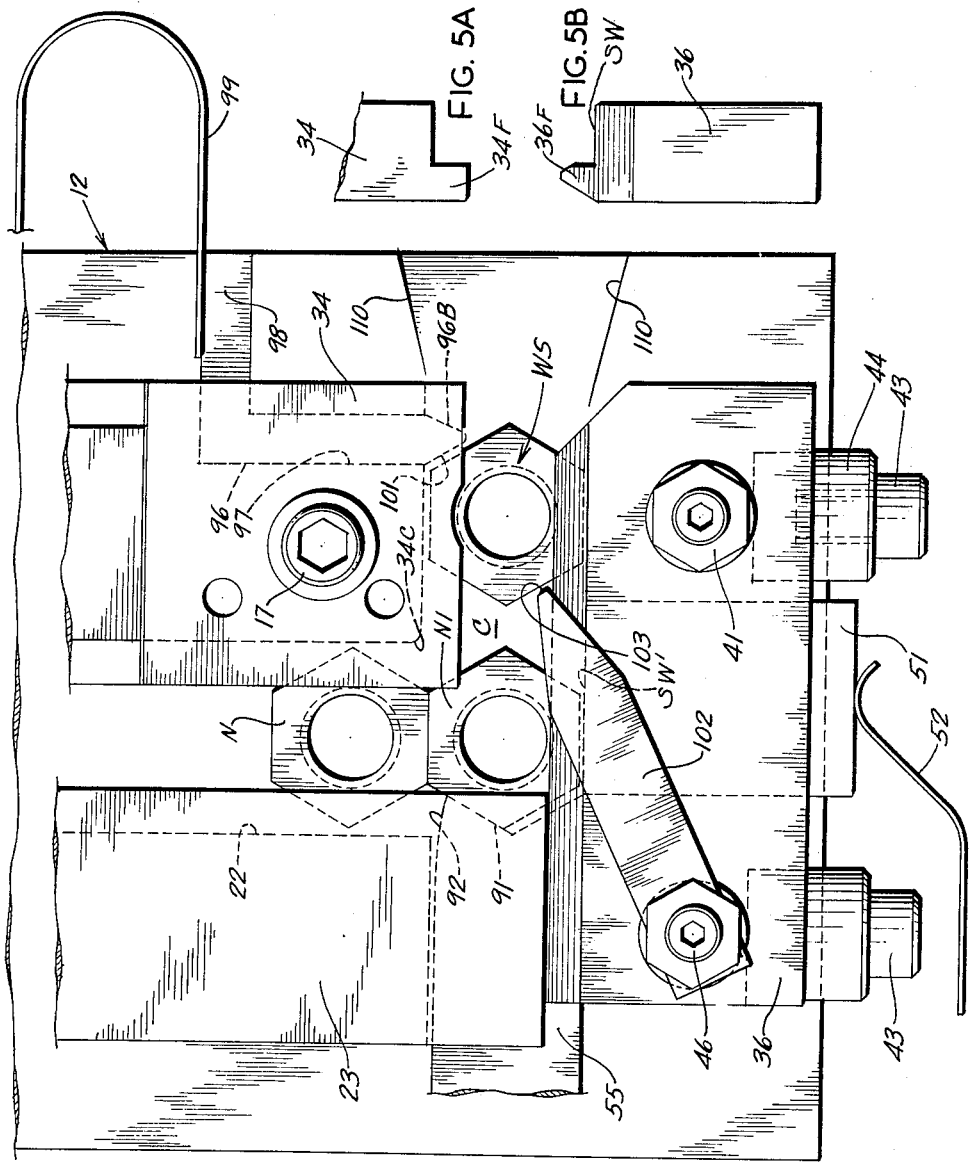
FIG. 5 is an enlarged detail view of a portion of the positioning fixture illustrated in FIG. 1.

In FIGS. 1–5 there is illustrated a positioning fixture constructed in accordance with one embodiment of this invention and designated generally by the reference numeral 11. In order to describe a particular form of the present invention, the positioning fixture 11 is illustrated as effective to feed a plurality of workpieces in the form of hexagonal-shaped nuts to a work station wherein the nuts are to be tapped and formed with internal threads. However, and as will become apparent from the description to follow, the positioning fixture of the present invention is not limited to the feeding of nuts as illustrated, but instead is adapted to feed any one of a wide variety of workpieces having various shaped outlined configurations. Thus, the present invention, which incorporates a jam arrestor mechanism to be described in greater detail hereinbelow, enables a wide variety of workpieces to be magazine fed in a rapid and quite economcial manner and without problems of jamming arising from the outline configuration of the workpieces.

As illustrated in FIG. 1, the positioning fixture 11 includes a magazine M, and a channel or guideway C which extends at substantially a right angle from a lower end of the magazine M. A work station WS is located within the channel C.

With particular reference to FIGS. 1, 2, and 4, it is seen that the positioning fixture 11 comprises a generally rectangular-shaped frame plate 12 which is spaced from a frame member 13 of a machine tool with which the positioning fixture 11 is associated by a spacer block 14 (see FIG. 2). Thus, a plurality of cap screws as 16 are seated within suitably recessed openings formed in the frame plate 12, and the cap screws 16 are threaded within the spacer block 14. A plurality of cap screws 17, in turn, mount the spacer block 14 to the frame member 13. The frame member 13 is preferably formed with openings 18 of somewhat larger diameter than the cap screws 18 and which enable a limited amount of lateral movement of the cap screw 17 with respect to the frame member 13 to be obtained. As illustrated in FIGS. 1 and 2, one or more fixture adjustment screws 19 enable the frame plate 12 of the positioning fixture 11 to be conveniently and precisely positioned in both coordinate directions with respect to the frame member 13 of the machine tool. In this manner the positioning fixture 11 can be readily aligned with the spindle of the machine tool.

The magazine M of the positioning fixture 11 comprises a pair of guide members 21A and 21B which define a first guideway 22 therebetween. A second pair of guide members 23 are also associated with the guide members 21, but in slightly overlapping relation to the edges defining the guideway 22. As best illustrated in FIG. 2, both of the guide members 21 and 23 are spaced outwardly from the frame plate 12 and are also spaced apart from one another by bushings 24 and 26. Threaded studs 27 and nuts 28 are utilized to attach the guide members to the frame plate 12. Thus, the guide members 21 and 23 along with the frame plate 12 define the magazine M for containing a plurality of workpieces, in this instance workpieces in the form of hexagonal shaped nuts N. As best illustrated in FIG. 4, the portions of the guide members 23 which overlap the guide members 21 effectively function as cover strips for maintaining the nuts in lateral position within the guideway 22 of the magazine.

The frame plate 12 is formed with a tapered opening 31 in the lower portion thereof in the surface facing the frame member 13, as illustrated in FIG. 2. The surface of the frame plate 12 opposite that facing the frame member 13 is formed with an annular recess 32, and the recess 32 is axially aligned with and communicates with the tapered opening 31. This construction of the frame plate 12 enables a wear bushing 33 to be mounted in the recess 32 of the frame plate in a manner such that the wear bushing 33 can be readily replaced by a bushing having a different size internal opening, whereby the size of the opening in the bushing can be readily matched to the diameter of the opening to be tapped in a nut. This constitutes an important feature of this invention since the nut is adequately supported and thereby prevented from wobbling at the work station. As noted hereinabove, the entire positioning fixture 11 can be quickly adjusted with respect to the frame member 13 so that the wear bushing 33 is aligned in the desired position at the work station WS.

The transfer channel C is defined in part by a pair of upper and lower guide members 34 and 36, as viewed in FIG. 2. The guide member 34 is affixed to the frame plate 12 by a cap screw 37 (see FIG. 1). The guide member 36 however is adapted to be adjustably positionable on the frame member 12, and for this purpose is formed with an enlarged opening 37 therein. A stud 38 is threaded at one end within the frame plate 12 and extends through the opening 37 in spaced relation therewith. A cover plate 39 is interposed between the guide member 36 and a nut 41 is threaded on the free end of the stud 38 so that turning down the nut 41 is effective to clamp both the cover plate 39 and the guide member 36 to the frame plate 12. The lowermost surface of the frame member 12, as viewed in FIG. 2, is formed with a recess 42. A cap screw 43 mounts a collar 44 which is slidable within the recess 42 and engageable with the lower surface of the guide member 36, as viewed in FIG. 2, to vary the vertical position of the guide member 36 and thus the width of the channel C.

In place of the separate guide member and cover plate construction illustrated in FIG. 2, the guide members 34 and 36 may be formed with integral flanges 34F and 36F for containing the nuts or similar workpieces in the channel C, as illustrated in FIGS. 5A and 5B.

It may be noted that the guide member 21A of the magazine M is adjustable toward or away from the guide member 21B to accommodate various size workpieces in conjunction with variation in the width of the channel C by adjusting the position of the guide member 36.

In accordance with the present invention a block member 51 is mounted for movement within the guide member 34 and is generally aligned with the guideway 22 of the magazine M. As viewed in FIG. 1, the upper surface of the block member 51 faces the nuts N stored within the magazine M and defines a portion SW', FIG. 5, of the lower planar side wall SW, FIG. 5B, of the channel C. Thus the surfaces SW' and SW are normally coplanar and represent respective portions of the lower wall of the channel C along which the workpieces are to move when being moved to the work station. Resilient means, in the form of a curved spring strip 52 attached to the spacer block 14 in any convenient manner, as by a pair of retainer plates 53 and a cap screw 54, biases the block member 51 toward the position illustrated in FIG. 1 where the surface SW' of the block 51 is coplanar with the contiguous surface or wall SW. As will be described hereinafter, the block member 51 serves as a bumper block which is movable laterally outwardly from the channel C to permit the nuts N to be rotated to a non-jamming position in the event that the nuts N become tilted at an undesirable angle in passing from the guideway 22 to the channel C.

In the particular embodiment of this invention illustrated in FIG. 1 the nuts N are adapted to gravity feed from the magazine M to the channel C. It will be recognized, of course, that such a gravity-feed arrangement could be replaced by a positive type of feed if so desired.

Positioning means, which include a plunger 55, are included in the positioning fixture 11 for transferring the nuts N from the magazine M to the work station WS. The plunger 55 is adapted to be reciprocated in feeding and retraction directions within the channel C by a double-acting pneumatic piston assembly 56. The piston assembly 56 includes a cylinder 57 which is mounted on the spacer block 14 by cap screws 58. The spacer block 14 is formed with elongated slotted openings 59 which enable the axial position of the cylinder 57 with respect to the positioning fixture 11 to be conveniently adjusted. The cylinder 57 includes an axially extending inner bore 61 in which a piston 62 is reciprocable. The piston 62 includes a rod portion 63 and the plunger 55 is mounted thereon by cap screws 64, thus enabling a plunger to be utilized which matches the configuration of the workpieces being fed. Air lines 66 and 67 are connected to the cylinder 57 to supply pressurized air thereto to produce reciprocation of the plunger 55 in the respective feeding and retracting directions. Thus, the piston 62 and plunger 55 are moved rightwardly in a feeding direction, as viewed in FIG. 1, whenever high pressure air is supplied through the air line 66, while high pressure supplied through the line 67 is effective to cause movement of the nut 41 plunger in the oposite direction. Because a double-acting piston arrangement is utilized, significant increases in speed of operation are realized as compared to piston arrangements using an air cushion or spring return arrangement, since there is no time interval required to build up an actuating pressure. Instead, the piston starts to move immediately upon application of pressurized air in either direction.

The stroke of the piston 62 is regulated to provide only the movement of the plunger 55 which is required to transfer a nut into the work station WS. Thus, as illustrated in FIG. 3, the stroke of the piston 62 is limited by engagement of the piston rod 63 with an end surface of the frame member 12. Control means, not illustrated, are provided for retracting the piston in coordination with movement of the spindle of the overall machine tool. Such control means may be similar to those described in my co-pending application Serial No. 797,933.

A control assembly, designated generally by the reference numeral 71 in FIG. 3, may be utilized for initiating the power stroke of the spindle of the machine tool once the plunger has attained the position illustrated in FIG. 1. The control assembly 71 comprises a microswitch 72 which is mounted on the spacer block 14 by a bracket 73. An angle strip 74, formed with oppositely projecting end portions 76 and 77, is mounted on the bracket 73 for a limited amount of axial movement with respect thereto by rivets 78 projecting through slotted openings 79 in the angle strip. The end 76 of the angle strip includes a cap screw 81 adapted to be locked in any selected adjusted position by a lock nut 82. As illustrated in FIG. 3, the end of the cap screw 81 is adapted to contact a button 83 of the microswitch 72 whenever the piston rod 63 engages the projecting leg 77 of the angle strip, at the conclusion of the feeding stroke of the plunger 55. Such contact of the cap screw 81 with the microswitch 72 is effective to initiate the power stroke of the spindle of the overall machine tool.

Under and in accordance with the present invention, the end surface of the plunger 55 is formed complementary to the periphery of the part to be transferred in the channel C. In this manner, the part being fed is maintained in a predetermined angular orientation in the channel C whenever the complementary surfaces of the plunger and the part being fed are matingly engaged to thereby assure passage of the part through the channel without jamming. In the embodiment illustrated in the drawings the plunger 55 is formed with a generally V-shaped notch in the free end thereof which provides an inclined surface 91, best shown in enlarged detail in FIG. 5. With continued reference to FIG. 5, it is seen that the surface 91 is adapted to engage a flat of a nut occupying the position indicated by the reference character N1. The inclination of the surface 91 enables the plunger 55 not only to exert a force in a horizontal direction for transferring the nut to the work station, but also to exert a force having a component acting vertically downwardly and which serves to maintain the lower flat of the nut N1 in engagement with the lowermost side wall of the channel C. In this manner the nut is maintained in predetermined angular orientation in the channel C with the uppermost and lower flats parallel to the side walls of the channel.

In the event that a nut in the position indicated as N1 in FIG. 5 should be tilted at some angle other than that illustrated, thus giving rise either to the possibility of some portion of the nut hanging up on the corner 34C of the guide member 34 or to the possibility of opposed corners of the nut becoming wedged against the side walls of the channel C, the spring-loaded bumper block 51 moves outwardly in coordination with feeding movement of the plunger 55, allowing the tilted nut to be rotated back to the position illustrated in FIG. 5. Thereafter, as described hereinabove, the configuration of the surface 91 of the plunger 55 is effective to maintain the nut in the desired alignment within the channel C.

It is another feature of the present invention that the upper surface of the plunger 55 is slightly curved as indicated by the reference numeral 92 to minimize any tendency of the plunger 55 to hook a nut in the magazine M during feeding movement of the plunger 55.

In accordance with the present invention, an escapement mechanism is provided for locating the nut, or other workpiece, at the work station WS by limiting movement of the nut beyond the work station in the feeding direction of the plunger 55. As illustrated in FIGS. 1 and 5, the escapement mechanism includes a trigger element 96 which is slidably disposed within a suitable opening formed in the guide piece 34. The trigger element 96 includes a downwardly extending leg 97 and an outwardly projecting leg 98 disposed at substantially a right angle to the leg 97. Resilient means, which include a looped spring strip 99, bias the trigger element 96 to a position wherein the lower surface of the leg 98 abuts a portion of the guide piece 34 and wherein a beveled end of the leg 97 presents an inclined surface 101 to a nut at the work station WS. The force exerted by the spring strip 99 is sufficient to maintain the trigger element 96 in the position illustrated in FIG. 5 until a succeeding nut is moved into engagement with the nut at the work station, whereupon the nut at the work station is ejected therefrom past the escapement mechanism by flexing the spring strip 99. In this regard it may be noted that a beveled surface 96B of the trigger 96 acts to forcibly eject the nut from the area of the work station WS. Also the frame member 12 may be formed with a diverging dished-out area 110 after the work station WS for minimizing catching of burrs on the workpieces machined at the work station.

It is another feature of this invention that means are provided for preventing any movement of a nut at the work station in the direction of the retraction stroke of the plunger 55. Such means comprise a spring member 102 which is attached at one end to the plate 39 by the nut 46. The opposite end of the spring strip 102 extends toward the work station WS and includes an edge 103 which is adapted to engage a surface of a nut at the work station opposed to that engaged by the surface 101 of the escapement mechanism. The spring strip 102 is adapted to be cammed outwardly from the cover plate 39 by a nut transferred from the magazine end of the channel C to the work station. However, the spring strip 102 snaps back to a position wherein the edge 103 is effective to abut a peripheral flat of the nut once the nut is positioned at the work station. If the nut should thereafter tend to return on the retraction stroke with the plunger 55, as by reason of oil or some other substance forming some adhesive bond between the nut and plunger, the spring strip 102 is effective to retain the nut at the work station. Additionally, the trigger element 96 and the retaining strip 102 are effective to assure positive positioning of a nut at the work station and interposed therebetween.

As illustrated in FIG. 1, a chute 106 may be mounted adjacent the work station WS for collecting nuts or other workpieces ejected therefrom.

While the operation of the various component parts of the positioning fixture 11 have been described hereinabove, the overall operation of the positioning fixture will now be summarized. Starting with the plunger 55 in the position illustrated in FIG. 1, suitable control means are effective to direct high pressure air through the air line 67 to retract the plunger 55 to the position illustrated in FIG. 5. Such retracting movement of the plunger 55 enables the next succeeding nut to drop from the magazine M to the channel C (see FIG. 5). After the conclusion of the tapping or other machining operation performed at the work station WS, high pressure air is delivered through the air line 66 to move the plunger 55 in a feeding direction. As a consequence of such movement of the plunger 55, the inclined surface 91 of the plunger moves into mating engagement with a corresponding flat of a nut and acts both horizontally and downwardly, as viewed in FIG. 5, to move the nut through the channel C and into the engagement with the nut at the work station. Continued movement of the plunger 55 ejects the nut at the work station past the escapement mechanism and positions the nut to be machined at the work station WS. Subsequently, the plunger 55 is again retracted while the spring strip 102 and the escapement mechanism trigger element 96 retain the nut in position at the work station.

The above-described operation assumes that the nuts pass from the magazine M to the channel C without becoming tilted from the positions illustrated in FIGS. 1 and 5. However, should the nuts become tilted, the jam arrestor mechanism, which includes the bumper block 51, acts in coordination with the movement of the plunger 55 to enable the nuts to be returned to the desired angular orientation as illustrated in the drawings.

Thus, a positioning fixture constructed in accordance with the present invention enables parts of varied configuration to be magazine loaded and automatically fed to a work station of a machine tool in a quite rapid manner and without problems of jamming. By reason of the jam arrestor construction of the present invention, the rate at which parts can be machined is dependent almost entirely upon the speed of the actual machining operation. Additionally, a positioning fixture constructed in accordance with the present invention assures quality of product by affording positive positioning of the part to be machined at the work station, and also by enabling interchangeable wear bushings to be matched to the size of the hole being tapped in the particular positioning fixture illustrated.

Hence, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A positioning fixture for sequentially feeding workpieces having peripheral corners and flats formed thereon one by one from a generally vertical magazine to a work station wherein a machining operation is to be performed, and subsequently ejecting said workpieces from said work station comprising means defining a first guideway constituting said magazine, spaced upper and lower guide members defining a second generally horizontal guideway having the work station disposed intermediate the ends thereof, said second guideway extending from one end of the first guideway, a positioning member reciprocable horizontally in first and second directions in said second guideway between said one end of said first guideway and said work station, said positioning member having an end surface formed with a notched configuration affording an inclined surface for engaging a peripheral flat of a workpiece to maintain a predetermined angular orientation of said workpiece between the guide members in said second guideway during movement in said first direction, the spacing of said upper and lower guide members being such as to enable the workpieces to be confined closely therein against rotation, block means mounted in said lower guide member presenting a surface which is part of said second guideway, resilient means biasing said block means upwardly toward a position wherein said surface of the block means is coplanar with and is part of the lower guide member of said second guideway, said block means being movable downwardly from said second guideway by engagement of a corner of an unaligned workpiece therewith to thereby permit said unaligned workpiece to be rotated into said predetermined angular orientation incidental to movement thereof within said second guideway in coordination with movement of said positioning member in said first direction, by forcing the unaligned workpiece into contact with the upper guide member, thereby rotating the unaligned workpiece and avoiding jamming of said workpieces in said second guideway, and a plurality of spring retaining means engageable with spaced portions about the boundary of a workpiece for retaining a workpiece in fixed axial position at said work station in the second guideway.

2. A positioning fixture as defined in claim 1 wherein said retaining means include an escapement trigger resiliently biased to project into said second guideway for engagement with a portion of a given boundary of a workpiece in said work station, but movable out of said second guideway along a path normal to said second guideway, by the transfer of another workpiece to said work station by said positioning member to thereby permit ejection of a workpiece from said work station.

3. In a positioning fixture of the kind wherein a plurality of nuts having peripheral corners and flats formed thereon about one boundary surface are sequentially fed one-by-one from an open end of a vertically disposed magazine and along a predetermined horizontal path through a guide channel to a work station wherein the nuts are to be threaded to form internal threads, the combination comprising a plunger member linearly movable in first and second directions along said path in said guide channel and having an end thereof formed with a generally V-shaped notch affording an inclined surface engageable with a flat of a nut to be threaded for maintaining a predetermined angular orientation of a nut in said guide channel, said plunger member being effective to transfer a nut from said open end of said magazine to said work station on each actuation of said positioning means in the first direction, escapement means including a trigger element movable vertically along a path normal to the first-named path and having opposed surfaces, resilient means biasing said trigger element to a position wherein one of said opposed surfaces engages a peripheral flat at one side of a nut at said work station to limit movement of a nut beyond said work station in said first direction of movement of said positioning means until the nut is displaced therefrom by another nut transferred to said work station by said plunger member causing said escapement trigger to move upwardly out of the guide channel, the other surface on said trigger element serving to engage a peripheral flat at the other side of the first named nut at the work station and thereby forcibly eject the first-named nut from the work station when the escapement trigger is free to move downwardly back toward said guide channel, a spring member having an edge engageable with another peripheral flat of said nut at the work station opposed to that engaged by said escapement trigger to prevent return of said nut with said plunger member in said second direction of movement, whereby a nut is retained in fixed position at said work station between the spring member and escapement trigger, block means disposed closely adjacent said open end of said magazine, and resilient means biasing said block means toward a position wherein a surface of said block means is coplanar with a contiguous portion of the bottom wall of said guide channel, said block means being movable outwardly of said guide channel in coordination with the transfer of said nuts from said magazine to said work station to enable said predetermined angular orientation of said nuts to be obtained and thereby avoid jamming of a nut in said guideway.

References Cited in the file of this patent

UNITED STATES PATENTS

| | | |
|---|---|---|
| 1,571,021 | Meyer | Jan. 26, 1926 |
| 1,993,474 | Brackett | Mar. 5, 1935 |
| 2,266,933 | Williams | Dec. 23, 1941 |
| 2,398,659 | Mead | Apr. 16, 1946 |
| 2,792,922 | Malhiot | May 21, 1957 |
| 2,932,428 | McGranahan | Apr. 12, 1960 |